(12) United States Patent
Vempati et al.

(10) Patent No.: US 9,515,988 B2
(45) Date of Patent: *Dec. 6, 2016

(54) DEVICE AND METHOD FOR SPLIT DNS COMMUNICATIONS

(75) Inventors: Ramprasad Vempati, Bangalore (IN); Varaprasad Amaraneni, Bangalore (IN); Pradeep Iyer, Cupertino, CA (US); Santashil PalChaudhuri, West Bengal (IN)

(73) Assignee: Aruba Networks, Inc., Sunnyvale, CA (US)

(*) Notice: Subject to any disclaimer, the term of this patent is extended or adjusted under 35 U.S.C. 154(b) by 104 days.

This patent is subject to a terminal disclaimer.

(21) Appl. No.: 13/407,451

(22) Filed: Feb. 28, 2012

(65) Prior Publication Data

US 2013/0111066 A1    May 2, 2013

Related U.S. Application Data

(63) Continuation-in-part of application No. 13/282,291, filed on Oct. 26, 2011.

(51) Int. Cl.
    *G06F 15/16*     (2006.01)
    *H04L 29/12*     (2006.01)
    *H04L 29/08*     (2006.01)

(52) U.S. Cl.
    CPC ......... *H04L 61/303* (2013.01); *H04L 61/1511* (2013.01); *H04L 61/2015* (2013.01); *H04L 67/1036* (2013.01)

(58) Field of Classification Search
    USPC .......................... 709/220, 223, 227
    See application file for complete search history.

(56) References Cited

U.S. PATENT DOCUMENTS

| | | | |
|---|---|---|---|
| 7,032,010 B1 * | 4/2006 | Swildens et al. ............ | 709/219 |
| 7,873,993 B2 | 1/2011 | King | |
| 8,005,981 B2 * | 8/2011 | Tuck et al. .................. | 709/238 |
| 8,423,631 B1 | 4/2013 | Mower et al. | |
| 8,443,435 B1 | 5/2013 | Schroeder | |
| 8,560,833 B2 | 10/2013 | Kumar et al. | |
| 8,769,057 B1 * | 7/2014 | Breau et al. ................. | 709/220 |
| 2001/0047429 A1 | 11/2001 | Seng et al. | |
| 2002/0103931 A1 * | 8/2002 | Mott ............................. | 709/245 |
| 2007/0094411 A1 * | 4/2007 | Mullane et al. ............. | 709/245 |
| 2007/0104197 A1 | 5/2007 | King | |
| 2009/0165099 A1 * | 6/2009 | Eldar et al. ...................... | 726/5 |

(Continued)

*Primary Examiner* — Joseph E Avellino
*Assistant Examiner* — Marshall McLeod
(74) *Attorney, Agent, or Firm* — Mannava & Kang, P.C.

(57) ABSTRACT

Automatically configuring split DNS operation in a wireless network device connected to a network. The wireless network device snoops one or more exchanged DHCP messages to obtain domain name(s) associated with the organization that are now used as target domain name suffix(es) for split DNS operations. For subsequent DNS queries, information within the message is analyzed to determine if the request includes a domain delimiter. If no delimiter, the DNS query message is sent to an internal DNS server that is located within an organization. If a delimiter exists, but the domain name in the message matches one of the target domain name suffixes, the DNS query message is sent to the internal DNS server as well. Otherwise, the DNS query message is routed over a different communication path.

21 Claims, 6 Drawing Sheets

(56) References Cited

U.S. PATENT DOCUMENTS

| | | |
|---|---|---|
| 2010/0269174 A1* | 10/2010 | Shelest .......................... 726/22 |
| 2012/0110320 A1 | 5/2012 | Kumar et al. |
| 2013/0111040 A1 | 5/2013 | Vempati et al. |
| 2013/0122910 A1 | 5/2013 | Singh et al. |
| 2013/0175600 A1 | 7/2013 | Jenne et al. |
| 2013/0179551 A1* | 7/2013 | Li ................................ 709/223 |

* cited by examiner

DEVICE AND METHOD FOR SPLIT DNS COMMUNICATIONS

CROSS-REFERENCE TO RELATED APPLICATIONS

This application is a continuation-in-part application of U.S. patent application Ser. No. 13/282,291 filed Oct. 26, 2011, the entire contents of which are incorporated herein by reference.

FIELD

Embodiments of the invention relate to remote access in digital networks, and more particularly to split communications in remote access to networks.

BACKGROUND

Digital networks have become the backbone of many organizations and enterprises. Within an organization, private networks can be secured with provisions that securely provide members of the organization access to resources within the organization.

In many cases, members of an organization wish to access these resources securely from remote locations, such as from home, or on the road.

One approach to providing such remote access is to provide members of the organization with remote access points (hereinafter singularly referred to as a "RAP"). Although connected to a public network, such as the Internet for example, a RAP provides a secure connection to organization resources. In operation, a RAP establishes a secure tunnel over the public network which is terminated inside the organization firewall.

The RAP provides wired or wireless access through the tunnel, providing secure access to organization resources by routing all client network activity through the tunnel and through the infrastructure located at the organization.

But routing all client network activity through the tunnel and through the organization has performance penalties.

As an example, consider a RAP user at home, connected to the organization infrastructure. When the client connects to an organization e-mail server, that connection goes through the tunnel established by the RAP to the e-mail server in the organization.

But when the client uses a web browser to visit a news website such as "cnn.com" or "slashdot.org" for example, that request and subsequent traffic are also directed through the tunnel and through the organization's infrastructure.

To alleviate this issue the concept of a split-tunnel was developed. For split-tunnel operations, certain traffic directed to a set of addresses and/or services are directed through the tunnel, while traffic to other addresses and/or services are routed directly to a public network that the RAP is attached to. So in the case of a split-tunnel, when the RAP client accesses slashdot.org, that request is not sent through the secure tunnel, but directly out to the Internet.

One implementation of the split-tunnel mechanism is Domain Name System (DNS) based. As is known in the art, the DNS mechanism maps domain names, such as "slashdot.org" to an IP address, such as "216.34.181.45." The split-tunnel DNS mechanism is configured to recognize a particular domain suffix, or pattern matches part of the domain name within a DNS request, and upon detecting a match, routes the DNS request through the tunnel.

As an example, if an organization's domain name is "acmesprockets.com," the split-tunnel DNS mechanism would route all DNS requests containing "acmesprockets" or the suffix "acmesprockets.com" through the tunnel to the organization's DNS for resolution to an IP address. However, other DNS requests not matching the pattern "acmesprockets" would be routed to the DNS associated with the Internet connection. Any failed DNS lookups based on DNS requests through the tunnel may also be re-routed to the DNS associated with the Internet connection.

In the example given, a DNS request for "mail.acmesprockets.com" will be routed through the tunnel, while a DNS request for "groklaw.net" will be routed to the DNS associated with the Internet connection.

A problem exists, however, in configuring the operation of the split-tunnel. The set of suffixes or pattern matches to be used in split-tunnel operation must be configured and managed for each and every RAP in use.

BRIEF DESCRIPTION OF THE DRAWINGS

Aspects of the invention may be best understood by referring to the following description and accompanying drawings that are used to illustrate embodiments of the invention in which.

DETAILED DESCRIPTION

Figure 1:
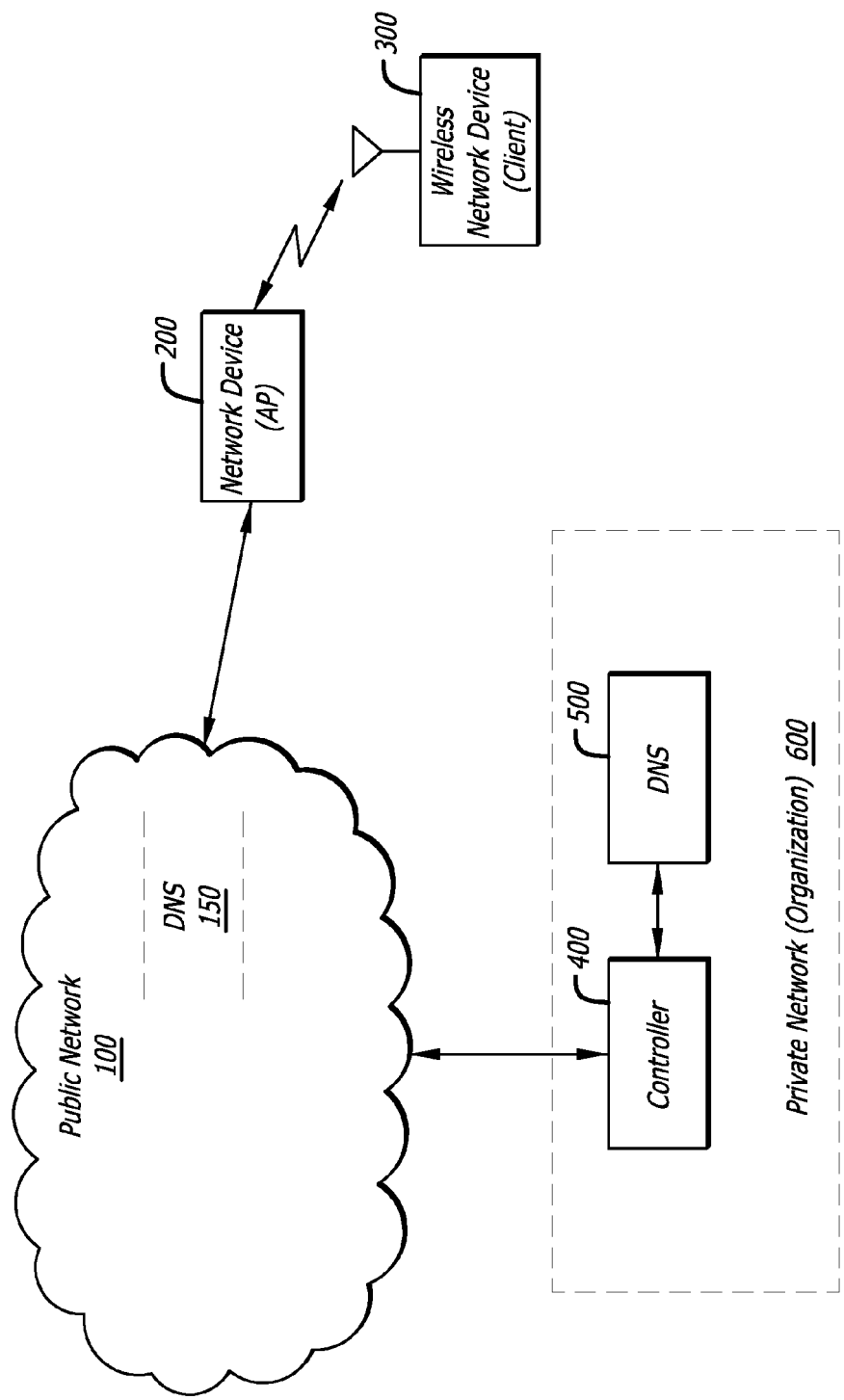
FIG. 1 is an illustrative embodiment of a network that is configured with a network device adapted to support data traffic through a first communication path directed to a private network and a second communication path directed to a public network based on an analysis of the contents of a DNS request.

Embodiments of the invention relate to a network device and method configured to perform split Domain Name System (DNS) communications as described below. According to one embodiment of the invention, a network device (e.g., an access point "AP") learns domain suffixes for split DNS communications through information exchanges during an initial phase of operation. For instance, one or more domain name suffixes may be provided within Dynamic Host Configuration Protocol (DHCP) options, namely fields in a DHCP message. Once known, the DNS server that is part of an organization (hereinafter referred to as the "internal DNS server") may be queried for other suffixes. For messages that include either (i) a full-form domain suffix (e.g., "acmesprockets.com", "acmesprockets.org", etc.) that matches at least one stored domain name suffix learned during a prior DHCP message exchange or (ii) no domain name suffix whatsoever, those messages are passed through a first communication path. The first communication path may be a secure path, such as a secure tunnel. Otherwise, these messages are routed through another communication path.

Herein, certain terminology is used to describe features for embodiments of the invention. For example, a "network device" generally refers to a device that includes logic adapted to transmit and/or receive signaling and to process information within such signaling. Different embodiments of a network device may include, but are not limited or restricted to an access point, a base station, a data transfer device (e.g., network switch, router, controller, brouter, etc.), or the like.

It is contemplated that the network device may include hardware logic, including one or more of the following: (i) a processor; (ii) one or more radios if wireless communications are supported (e.g., component that handles the wireless data transmission/reception); (iii) one or more physical connectors to support wired connectivity; and (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive).

Additionally, the term "logic" is generally defined as hardware and/or software. As hardware, logic may include processing circuitry (e.g., a controller, a microprocessor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The terms "connection" is broadly defined as a logical or physical communication path. One type of communication path may involve a non-transitory medium such as, for instance, electrical wire, optical fiber, cable, bus trace, or a wireless channel using infrared, radio frequency (RF), or any other wireless signaling mechanism. Similarly, the term "connected" is broadly used to describe a communicative coupling between two network devices. The term "message" constitutes any grouping of data in the form of a packet, an Asynchronous Transfer Mode (ATM) cell, a frame, or any series of bits having a prescribed format.

Lastly, the terms "or" and "and/or" as used herein are to be interpreted as an inclusive or meaning any one or any combination. Therefore, "A, B or C" and "A, B and/or C" mean "any of the following: A; B; C; A and B; A and C; B and C; A, B and C." An exception to this definition will occur only when a combination of elements, functions, operations or acts are in some way inherently mutually exclusive.

According to one embodiment of the present invention and as shown in FIG. 1, a first network device (client) 300 connects through a second network device 200 (e.g., access point "AP") to a network 100 (e.g. Internet or other public network). As shown, second network device 200 is an access point (AP), although it may also be a remotely located switch, or a remotely located controller. Network 100 provides access to a private network managed for a particular entity (e.g., an organization 600). Organization 600 comprises a controller 400 and a dedicated (internal) DNS server 500. It is contemplated that AP 200, along with client 300, may be implemented physically separated from the private network (as shown), but may be considered to be logically implemented within the private network.

According to one embodiment, AP 200 is a purpose-built digital device containing a processor, a memory hierarchy, and input/output interfaces. Such devices typically operate under the control of an operating system such as Linux®, running specific programs to provide for access point operation. A MIPS-class processor such as one from Cavium or NetLogic—RMI may be used. Wired network interfaces typically are IEEE 802.3 Ethernet interfaces. Wireless interfaces are typically IEEE 802.11 WiFi™ interfaces. The memory hierarchy of the device typically contains fast read-write memory for holding programs and data during device operation, and a hierarch of persistent memory such as ROM, EPROM, and Flash for holding instructions and data needed for device startup, and a file system for device operation.

Similarly, controller 400 and (internal) DNS server 500 are also purpose-built digital devices, containing a processor, a memory hierarchy, and input/output interfaces. Such devices typically operate under the control of an operating system such as Linux, running specific programs to provide for access point operation. A MIPS-class processor such as one from Cavium or NetLogic—RMI may be used. Wired network interfaces typically are IEEE 802.3 Ethernet interfaces. Wireless interfaces are typically IEEE 802.11 WiFi™ interfaces. The memory hierarchy of the device typically contains fast read-write memory for holding programs and data during device operation, and a hierarch of persistent memory such as ROM, EPROM, and Flash for holding instructions and data needed for device startup, and a file system for device operation.

While DNS server 500 is shown as a separate device in communication with network 100, it may also be implemented as a process running for example on controller 400, or on another suitable network device such as a server, switch, or router.

Client 300 is also a purpose-built digital device such as a laptop, notebook computer, tablet, handheld device, smartphone, or other digital device containing processor, memory hierarchy, and input/output interfaces such as a display, speaker, microphone, and radios typically for 802.11 Wi-Fi communications.

For clarity, FIG. 1 does not show other typical network devices such as switches, routers, firewalls, and the like which are well understood by the art.

According to one embodiment of the present invention, AP 200 is connected to network 100. This connection may be direct, or may be through a device such as a cable modem, DLS modem, wireless bridge, or through other similar mechanism.

As part of initialization, AP 200 uses a DNS server 150 associated with network 100 (e.g., hereinafter referred to as "external DNS server" 150) to look up the Internet Protocol (IP) address of controller 400. Assume for this example that organization 600 may be identified as "acmesprockets.com." AP 200 issues a message (e.g., DNS Request) for "acmesprockets.com," and in return, receives a message including an IP address, for example "212.77.8.1". In an alternate embodiment, AP 200 may be configured with this IP address, eliminating the need to perform the initial DNS lookup.

AP 200 may be adapted to use this address to establish a communication path 450, such as a secure tunnel for example, to controller 400. Controller 400 is adapted to terminate a connection with AP 200 and provide client 300 access to services inside organization 600, including DNS server 500. Of course, it is contemplated that a tunnel may not be necessary as the availability of two communication paths directed to external DNS server 150 and internal DNS server 500 may be sufficient to practice the invention as set forth in FIG. 5 below.

Figure 2:
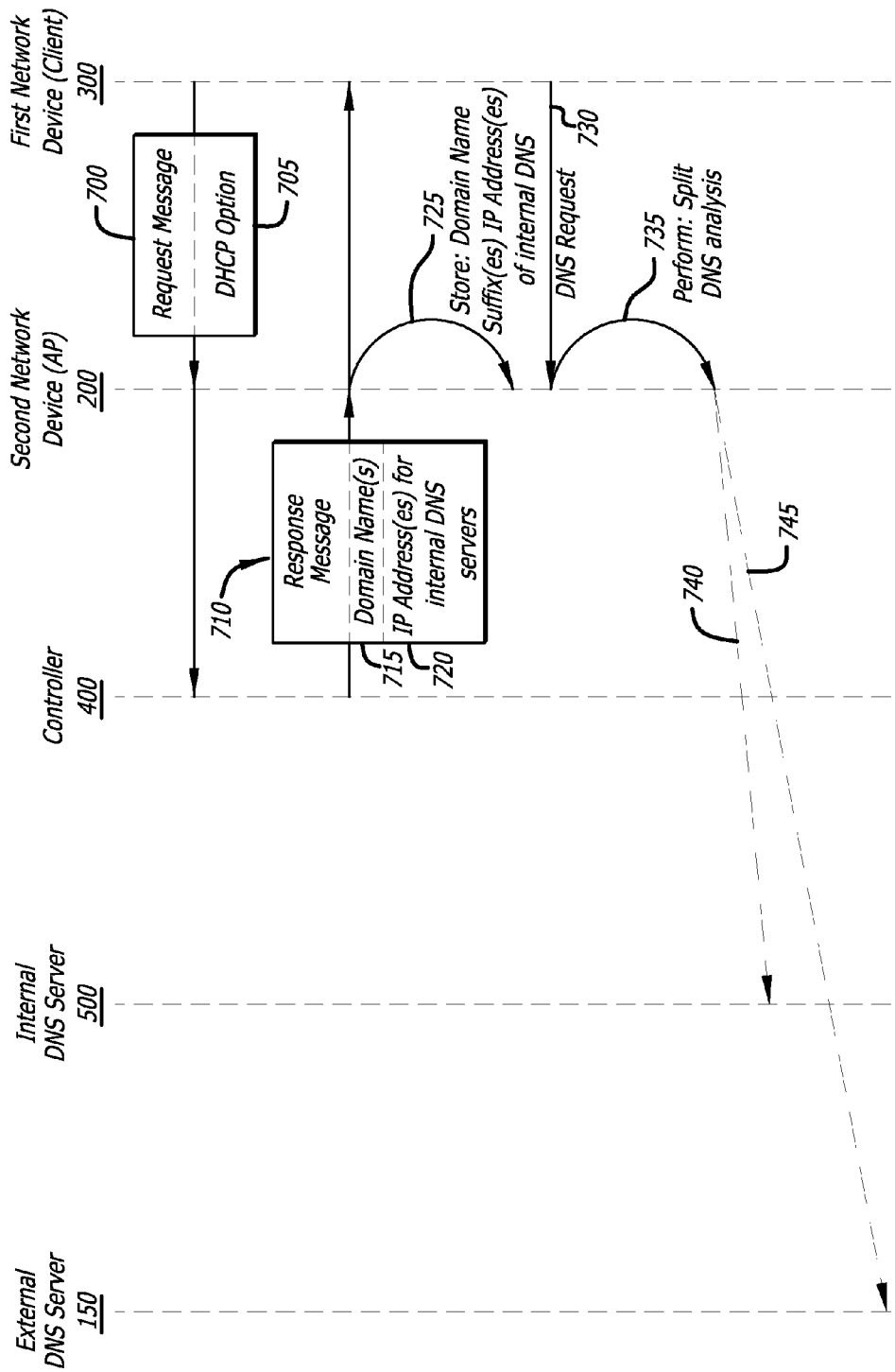
FIG. 2 is a first illustrative embodiment of communications between network devices to determine one or more domain suffixes or character patterns for selecting a DNS server.

For client 300 to use services inside organization 600, it should first obtain an IP address for internal DNS server 500. According to one embodiment of the invention, this may be accomplished using Dynamic Host Configuration Protocol (DHCP). For instance, as shown in FIG. 2, client 300 issues a request message 700 (e.g., DHCP Request) across a connection 450 to controller 400. DHCP is described for example in RFC 2131 for IPv4 networks, and in RFC 3315 and RFC 3633 for IPv6 networks.

According to this embodiment of the present invention, when performing operations in accordance with DHCP, AP 200 snoops request message 700 (e.g., DHCP Request) from client 300 and a response message (e.g. DHCP Offer) 710 from controller 400. AP 200 ensures that request message 700 properly requests a domain name from controller 400 by using DHCP options 705, namely one or more fields within DHCP Request 700 as defined in RFC 2132, in order to request a domain name for organization 600 from controller 400 as well as the IP address of internal DNS server 500. In this example, returned to client 300, DHCP Offer 710 comprises DHCP options that include an address 720 of internal DNS server 500 (e.g., "10.1.1.50" as the IPv4 address) and at least one full-form domain name 715 (e.g., "acmesprockets.com"). Note that multiple DNS server addresses may be returned.

According to this embodiment of the invention, AP 200 snoops DHCP Offer 710 returned by internal DNS server 500 and utilizes its domain name suffix returned by DHCP options, namely "acmesprockets.com," for split DNS communications as shown in operation 725.

According to one embodiment of the invention, subsequent DNS queries (e.g., DNS Request messages) matching the domain name suffix "acmesprockets.com" are sent to internal DNS server 500 as shown in operations 730, 735 and 740. DNS queries which do not match the domain name suffix are sent to external DNS server 150 associated with network 100 as shown in operation 730, 735 and 745.

In an embodiment of the invention, a DNS query message (e.g., DNS Request message) may have domain name suffix appended and a DNS lookup is sent to internal DNS server 500. If this DNS query fails, then the DNS query is redirected to the external DNS server of network 100. This allows, as an example, the client to issue a browser request for "intranet" and have a DNS query sent to internal DNS server 500 as "intranet.acmesprockets.com".

According to another embodiment of the invention, a DNS query matching the domain name suffix "acmesprockets.com" is sent to internal DNS server 500. Also, when the DNS query does not contain a domain delimiter such as ".", the domain name suffix (e.g., ".acmesprockets.com") is appended so the resultant DNS request such as "intranet" or "mailserver" undergo a lookup operation through internal DNS server 500. A DNS query which does not match the domain name suffix (e.g., requests such as "cnn.com" or "slashdot.org") is sent to external DNS server 150 associated with network 100.

In an embodiment of the invention, once the address of internal DNS server 500 is known, DNS server 500 can be queried by AP 200 for other domains and subdomains also available. As an example, while the primary domain served by controller 400 is "acmesprockets.com" it may also serve the domains "sprocketsbymail.com" and "elitesprocketsbyfred.com". By querying DNS server 500, AP 200 can obtain these domain name suffixes as well, and add them to the list of suffixes to be recognized in split DNS operation.

It should be understood that since the request message (e.g., an initial DHCP DISCOVER request) sent by client 300 to controller 400 contains the hardware (MAC) address of client 300, the IP address allocated to client 300 for its secure tunnel is allocated based on the MAC address of client 300. This allows for split DNS communications to be set up on a per-client basis. As an example, a client MAC recognized as a member of the engineering staff would be assigned an address providing access to engineering services such as servers and the like, while not providing access to finance or operations servers.

It is contemplated that the split DNS communications may be enhanced for use by other network devices remotely located from AP 200, such as first network device (client) 300. This enhancement is to cover a situation were first network device 300 is never brought into trusted network. First network device 300 establishes a secure connection (e.g., secure tunnel) to controller 400 and is implemented with logic so that, if another network device performs a DHCP message exchange in private network 500, first network device 300 is adapted to snoop and acquire and store domain name(s) from DHCP offers for use in split-DNS communications at first network device 300. This enables first network device 300 to also snoop DHCP messages to produce a listing of one or more domain name suffixes for use in deciding whether to route subsequent DNS queries to an external DNS server or an internal DNS server on a trusted network as describe above.

Figure 3:
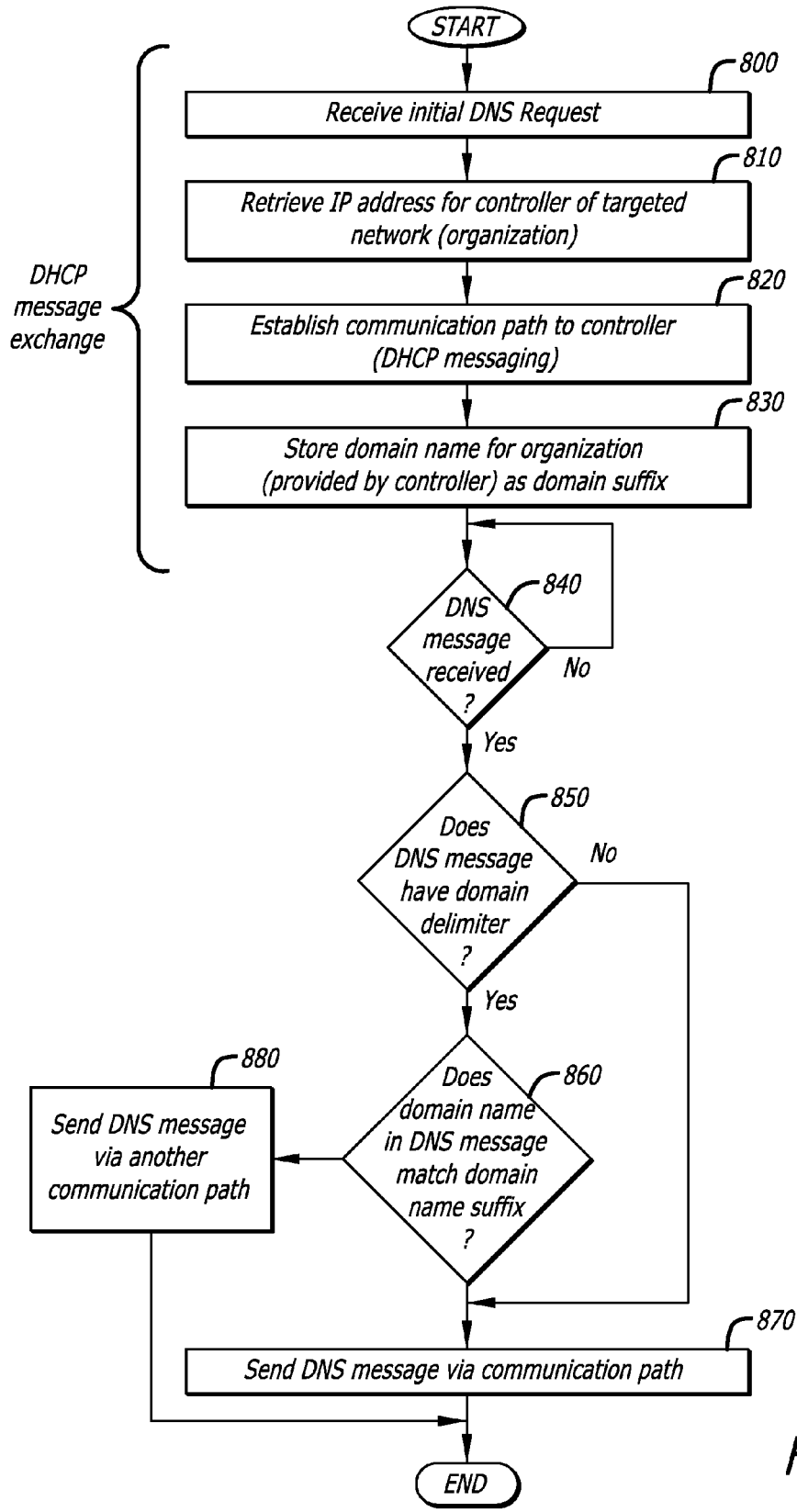
FIG. 3 is an illustrative embodiment of a flowchart that outlines the operations of a network device in determining routing for an incoming DNS packet.

Referring now to FIG. 3, an illustrative embodiment of communications handled by a network device to determine one or more domain suffixes or character patterns for selecting a DNS server is described. Initially, a network device receives an initial DNS request message that includes an identified domain name for a targeted network (i.e. organization) as illustrated in block 800. In response to the initial DNS request message, the network device accesses a first DNS server associated with a network to which the network device is connected in order to receive an address associated with a controller associated with the organization (block 810). According to one embodiment, the address is Internet Protocol (IP) address such as an IPv4 or IPv6 address.

Upon receipt of the IP address, the IP address is stored by the network device and is used to establish a communication path, such as a secure tunnel for example, to a controller that monitors access to a private network associated with the domain name and controls access to services within the private network such as an organization, including an internal DNS server for the private network (block 820).

More specifically, for a device (client) to use services inside the organization, it should first obtain an IP address for the internal DNS server. According to one embodiment of the invention, this may be accomplished through a DHCP message exchange in which a domain name suffix for organization (e.g., "acmesprockets.com") and the IP address of the dedicated DNS server are retrieved from the controller (block 830).

Once the internal (host) DNS server is known, this DNS server may be queried for other domain name suffixes to be routed over the communication path. For instance, where the internal DNS server is a Windows® based server, the controller may be adapted to transmit a command similar to an executable "dnscmd" which, when executed by internal DNS server, locates all domain name suffixes used by the organization and outputs the results to the controller. Of course, this would require the IP address of the controller to be added as an authorized IP address for internal DNS server as such servers typically will not respond to anonymous/ unauthorized requests. From the output, the domain name suffixes can be parsed for use in split-DNS communications. For instance, an output of this command when executed by the internal DNS server is the following:

Acmesprockets.com Primary file
    Planes.acmesprockets.com Secondary file
    Corp.acmesprockets.com Secondary file
    Engineering.acmesprockets.com Secondary file
    Widgetmaker.com Primary file
    Design.widgetmaker.com Secondary file
    Acmelabs.com Primary file Thereafter, for subsequent messages (e.g., DNS query, etc.) received by the network device that include either (i) a full-form domain suffix corresponding to the domain name of the organization or (ii) no domain suffix whatsoever, those messages are passed through a communication path to controller for subsequent receipt by the dedicated DNS server (blocks 840, 850, 860 and 870). Otherwise, these messages are routed through another communication path such as to the Internet (block 880).

It is contemplated that the operations set forth by the network device 200/1000 in FIGS. 2-6 may be conducted manually with user control or may be performed automatically without user intervention.

The present invention may be realized in hardware, software, or a combination of hardware and software. A typical combination of hardware and software may be a network server or access point with a computer program that, when being loaded and executed, controls aspects of the host device such that it carries out the methods described herein.

Figure 4:
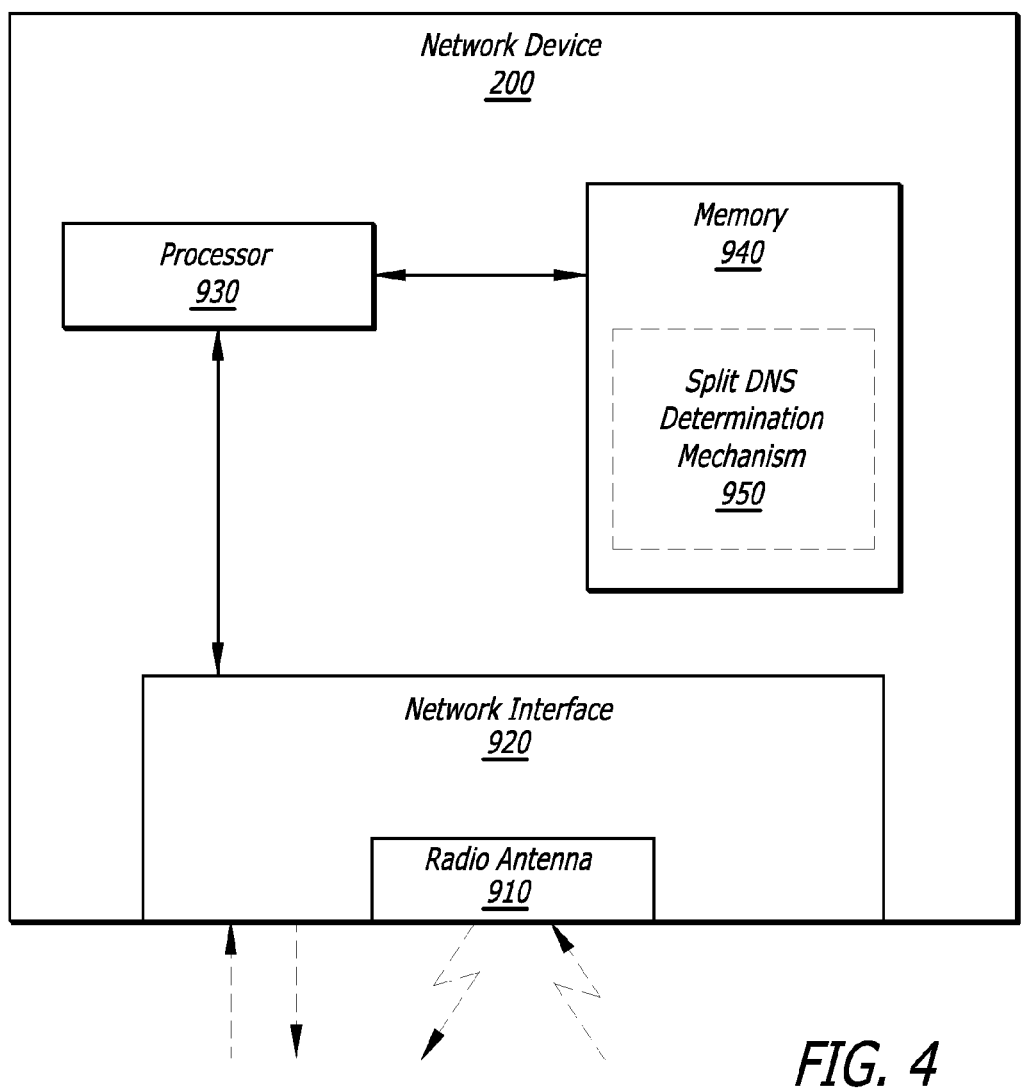
FIG. 4 is a first illustrative embodiment of a network device adapted to perform the split DNS communication scheme.

For instance, as shown in FIG. 4, a block diagram illustrating network device for supporting split DNS communications is shown. Operating as a device in a wireless digital network, network device 200 includes at least one or more radio antennas 910 capable of either transmitting or receiving radio signals or both, a network interface 920 capable of communicating to a wired or wireless network, a processor 930 capable of processing computing instructions, and a memory 940 capable of storing instructions and data. Moreover, network device 200 further includes a split DNS determination mechanism 950 that is adapted to automatically configure the network device for enabling performance of the split DNS operations described above in FIG. 3.

Radio antenna 910 may be any combination of known or conventional electrical components for receipt of signaling, including but not limited to, transistors, capacitors, resistors, multiplexers, wiring, registers, diodes or any other electrical components known or later become known.

Network interface 920 can be any communication interface, which includes but is not limited to, a modem, token ring interface, Ethernet interface, wireless IEEE 802.11 interface, cellular wireless interface, satellite transmission interface, or any other interface for coupling network devices.

Processor 930 can include one or more microprocessors and/or network processors. Memory 940 can include storage components, such as, Dynamic Random Access Memory (DRAM), Static Random Access Memory (SRAM), etc.

Split DNS determination mechanism 950 is optionally adapted to automatically obtain IP addresses for DNS servers located within various organizations in order to provide secure communications with and utilize resources within such networks. Furthermore, to avoid unnecessary traffic loads over a communication path to the organization, especially where the communication path is secure, split DNS determination mechanism 950 learns the domain name associated with a targeted organization and utilizes the full-form domain suffix as a comparison value for routing purposes. In particular, for subsequent messages received by the network device that include either (i) a full-form domain suffix corresponding to the domain name of the organization or (ii) no domain suffix whatsoever, those messages are passed by split DNS determination mechanism 950 through the communication path to a controller associated with the organization. Otherwise, split DNS determination mechanism 950 routed the messages through another communication path such as to the Internet.

Figure 5:
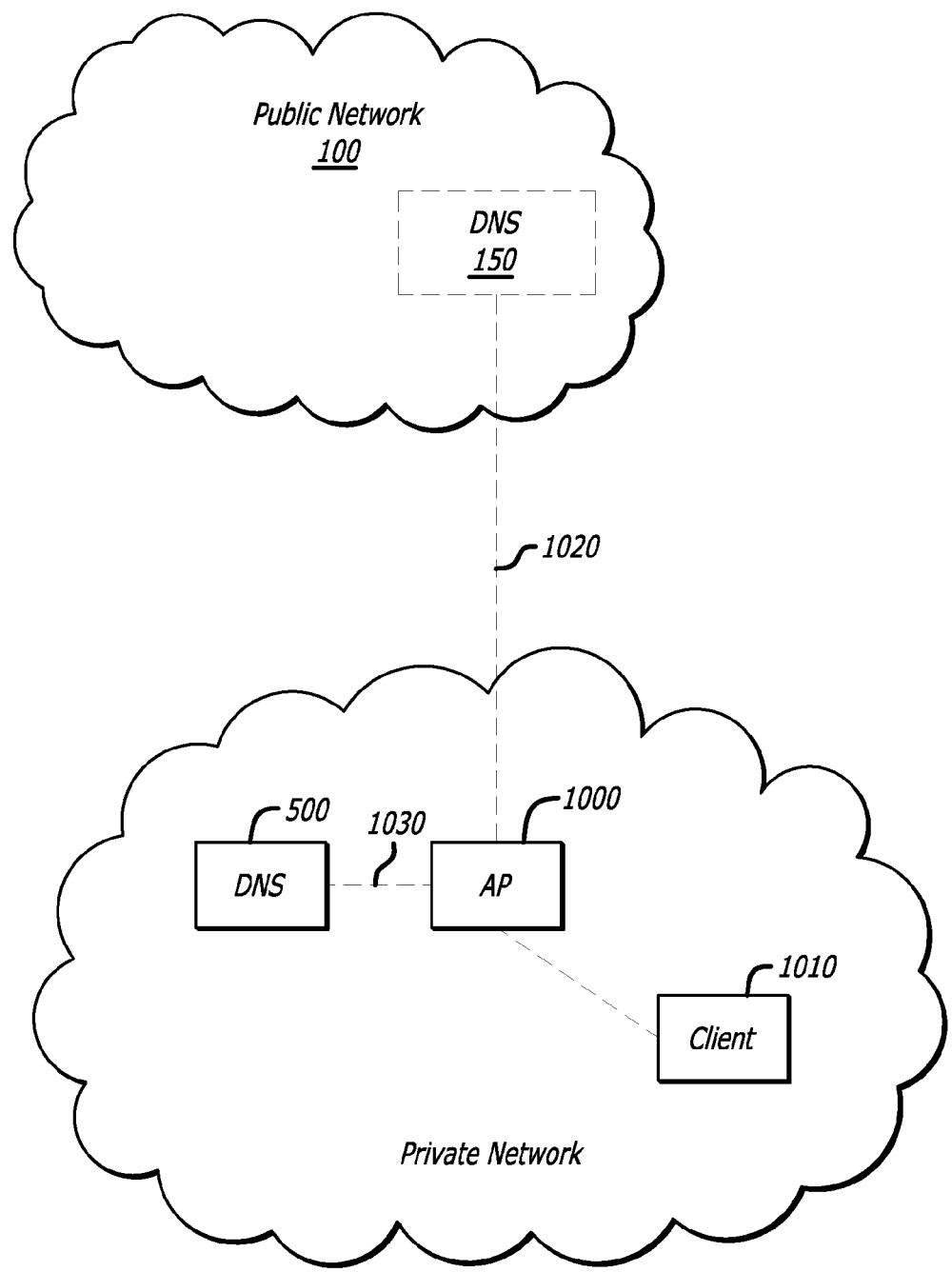
FIG. 5 is a second illustrative embodiment of communications between network devices to determine one or more domain suffixes or character patterns for selecting a DNS server.

Referring now to FIG. 5, a second illustrative embodiment of communications supported by network device 1000 to determine one or more domain name suffixes for selecting a DNS server is shown. Herein, network device 1000 is adapted to learn domain name suffixes (e.g., acmesprockets.com) through DHCP message exchanges initiated by another (client) network device 1010. According to one embodiment of the invention, a domain name suffix (or perhaps multiple domain name suffixes) may be included within a portion of a message prompted by an event by network device 1000. For instance, a domain name suffix may be included within a portion of a DHCP response message, such as within the "DHCP Options" section with a DHCP Offer message.

As network device 1000 learns one or more domain name suffixes, these domain name suffixes may be stored within network device 1000 itself (e.g., stored as part of the device profile) or within a memory device accessible by network device 1000. Thereafter, in response to a subsequent DNS message (e.g. DNS Request), network device 1000 is configured to decide whether to establish communications with external DNS server 150 located in public network 100 over a first communication path 1020 or with internal DNS server 500 located in private network 600 over a second communication path 1030. First communication path 1020 and/or second communication path 1030 may be secure (e.g., secure tunnel, etc.).

Figure 6:
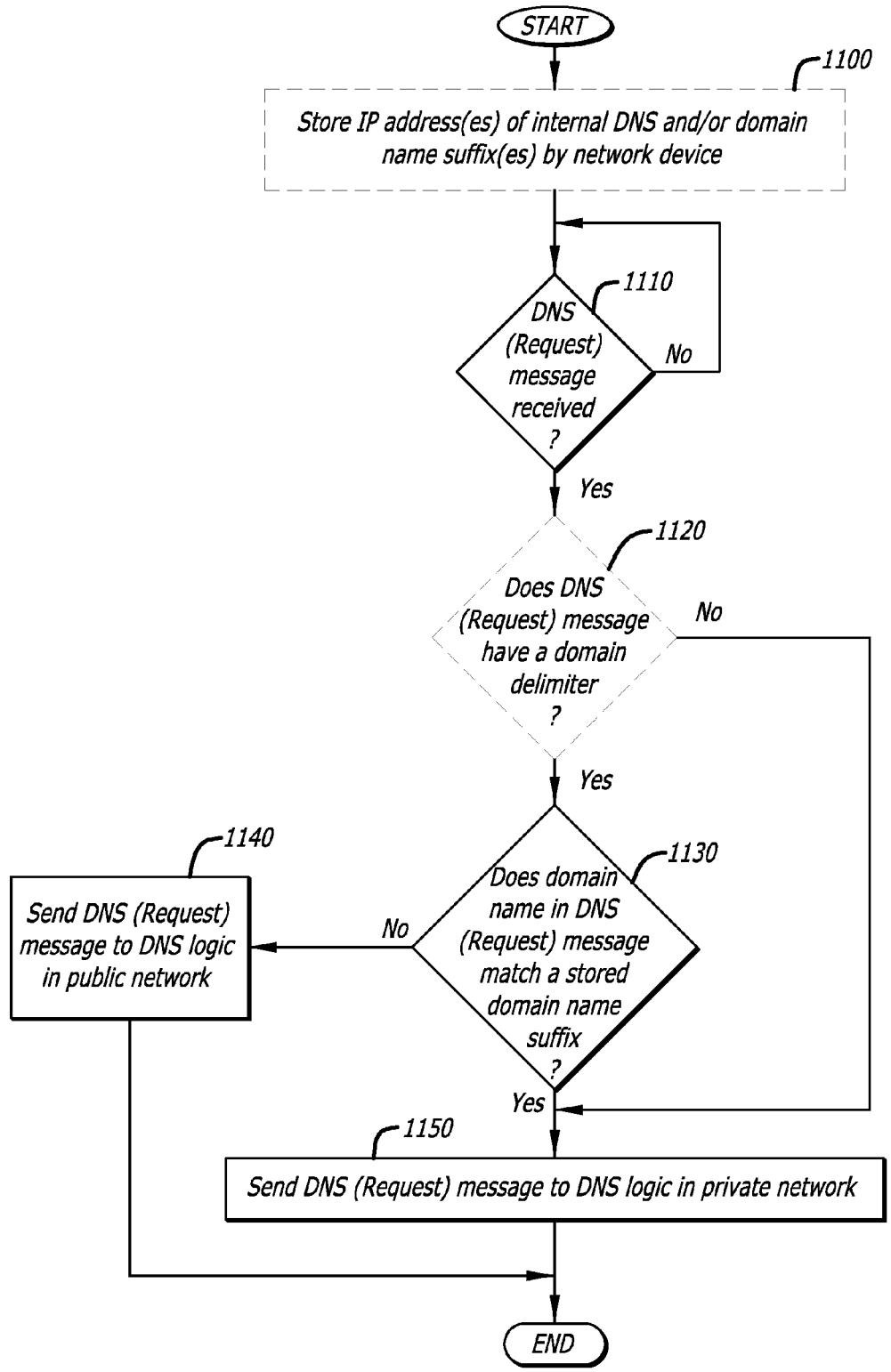
FIG. 6 is a second illustrative embodiment of a flowchart that outlines the operations of a network device in determining routing for an incoming DNS packet.

Referring to FIG. 6, a second illustrative embodiment of a network device adapted to perform the split DNS communication scheme is shown. Herein, as an optional operation, IP address(es) for DNS logic within a private network (e.g. internal DNS server) and one or more domain name suffixes associated with the private network are stored by a network device (block 1100). Also, IP address(es) for one or more external DNS server, which is(are) usually programmed by administrator, may be stored by the network device. Of course, it is contemplated that such information may be merely available to the network device and is not stored therein.

Upon detecting an incoming DNS message (block 1110), such as a DNS Request message for example, the network device optionally determines if the DNS message includes a domain delimiter (block 1120). If not, the network device recognizes that the DNS message is directed to DNS logic within the private network and sends the DNS message to this DNS logic (e.g., internal DNS server 500 of FIG. 5) as shown in block 1150.

In the event that the incoming DNS is not checked for a domain delimiter (or a check is performed and the incoming DNS message features a domain delimiter), the network device determines whether the DNS message features a domain name that matches a domain name suffix that is stored by (or at least accessible to) the network device (block 1130). If not, the DNS message is sent to the DNS logic (e.g., external DNS server 150) located in the public network over the first communication path (block 1140). If the network device determines that the domain name in the DNS message matches a recognized domain name suffix, the DNS message is sent to DNS logic (e.g., internal DNS server 500) located on the private network (block 1150).

This invention may be embodied in other forms without departing from the spirit or essential attributes thereof. Accordingly, reference should be made to the following claims, rather than to the foregoing specification, as indicating the scope of the invention.

What is claimed is:

1. A computer-implemented method, comprising:
   receiving a dynamic host configuration protocol (DHCP) response message, wherein the DHCP response message is sent by a DHCP server in a private network, wherein the DHCP response message provides an Internet Protocol (IP) address to a network device, and wherein the DHCP response message is associated with a domain name service (DNS) server and a response message domain name;
   determining the response message domain name associated with the DHCP response message, wherein determining includes evaluating content of the DHCP response message;
   receiving a DNS request message, wherein the DNS request message is sent to a DNS server to look up the IP address for a domain name, and wherein the DNS request message is associated with a request message domain name;
   determining the request message domain name associated with the DNS request message, wherein determining includes evaluating content of the DNS request message;
   comparing the response message domain name associated with the DHCP response message with the request message domain name associated with the DNS request message; and
   routing the DNS request message, wherein the DNS request message is routed over a secure connection to the DNS server in the private network associated with the DHCP response message when the request message domain name associated with the DNS request message matches the response message domain name associated with the DHCP response message.

2. The method of claim 1, wherein the DNS request message is routed to a different DNS server when the request message domain name of the DNS request message does not match the response message domain name associated with the DHCP response message.

3. The method of claim 1, further comprising:
   generating a list of additional domain names, wherein generating the list includes querying the DNS server;
   comparing the list of additional domain names with the request message domain name associated with the DNS request message; and
   routing the DNS request message to the DNS server when a domain name on the list of additional domain names matches the request message domain name the DNS request message.

4. The method of claim 1, further comprising:
   receiving a DHCP request message; and
   determining whether the DHCP request message enables the DHCP response message to include the response message domain name.

5. The method of claim 1, further comprising:
   receiving a DHCP request message, wherein a DHCP request message is associated with a client; and
   determining the client associated with the DHCP request message, wherein determining includes evaluating content of the DHCP request message.

6. The method of claim 5, wherein the DNS request message is routed to the DNS server, and the DNS server is associated with both the DHCP response message and the client associated with the DHCP request message.

7. A computer-implemented system, the system comprising:
   one or more processors;
   a display;
   an input device; and
   one or more non-transitory computer-readable storage mediums containing instructions configured to cause the one or more processors to perform operations including:
   receiving a dynamic host configuration protocol (DHCP) response message, wherein the DHCP response message is sent by a DHCP server in a private network, wherein the DHCP response message provides an Internet Protocol (IP) address to a network device, and wherein the DHCP response message is associated with a domain name service (DNS) server and a response message domain name;
   determining the response message domain name associated with the DHCP response message, wherein determining includes evaluating content of the DHCP response message;
   receiving a DNS request message, wherein the DNS request message is sent to a DNS server to look up the IP address for a domain name, and wherein the DNS request message is associated with a request message domain name;
   determining the request message domain name associated with the DNS request message, wherein determining includes evaluating content of the DNS request message;
   comparing the response message domain name associated with the DHCP response message with the request message domain name associated with the DNS request message; and
   routing the DNS request message, wherein the DNS request message is routed over a secure connection to the DNS server in the private network associated with the DHCP response message when the request message domain name associated with the DNS request message matches the response message domain name associated with the DHCP response message.

8. The system of claim 7, wherein the DNS request message is routed to a different DNS server when the request message domain name of the DNS request message does not match the response message domain name associated with the DHCP response message.

9. The system of claim 7, further comprising instructions configured to cause the one or more processors to perform operations including:
   generating a list of additional domain names, wherein generating the list includes querying the DNS server;
   comparing the list of additional domain names with the request message domain name associated with the DNS request message; and
   routing the DNS request message to the DNS server when a domain name on the list of additional domain names matches the request message domain name the DNS request message.

10. The system of claim 7, further comprising instructions configured to cause the one or more processors to perform operations including:
    receiving a DHCP request message; and
    determining whether the DHCP request message enables the DHCP response message to include the response message domain name.

11. The system of claim 7, further comprising instructions configured to cause the one or more processors to perform operations including:
    receiving a DHCP request message, wherein a DHCP request message is associated with a client; and
    determining the client associated with the DHCP request message, wherein determining includes evaluating content of the DHCP request message.

12. The system of claim 11, wherein the DNS request message is routed to the DNS server, and the DNS server is associated with both the DHCP response message and the client associated with the DHCP request message.

13. A computer-program product tangibly embodied in a non-transitory machine-readable storage medium, including instructions configured to cause a data processing apparatus to:
    receive a dynamic host configuration protocol (DHCP) response message, wherein the DHCP response message is sent by a DHCP server in a private network, wherein the DHCP response message provides an Internet Protocol (IP) address to a network device, and wherein the DHCP response message is associated with a domain name service (DNS) server and a response message domain name;
    determine the response message domain name associated with the DHCP response message, wherein determining includes evaluating content of the DHCP response message;
    receive a DNS request message, wherein the DNS request message is sent to a DNS server to look up the IP address for a domain name, and wherein the DNS request message is associated with a request message domain name;
    determine the request message domain name associated with the DNS request message, wherein determining includes evaluating content of the DNS request message;
    compare the response message domain name associated with the DHCP response message with the request message domain name associated with the DNS request message; and
    route the DNS request message, wherein the DNS request message is routed over a secure connection to the DNS server in the private network associated with the DHCP response message when the request message domain name associated with the DNS request message matches the response message domain name associated with the DHCP response message.

14. The computer-program product of claim 13, wherein the DNS request message is routed to a different DNS server when the request message domain name of the DNS request message does not match the response message domain name associated with the DHCP response message.

15. The computer-program product of claim 13, further comprising instructions configured to cause a data processing apparatus to:
    generate a list of additional domain names, wherein generating the list includes querying the DNS server;
    compare the list of additional domain names with the request message domain name associated with the DNS request message; and
    route the DNS request message to the DNS server when a domain name on the list of additional domain names matches the request message domain name the DNS request message.

16. The computer-program product of claim 13, further comprising instructions configured to cause a data processing apparatus to:
    receive a DHCP request message; and
    determine whether the DHCP request message enables the DHCP response message to include the response message domain name.

17. The computer-program product of claim 13, further comprising instructions configured to cause a data processing apparatus to:
    receive a DHCP request message, wherein a DHCP request message is associated with a client; and
    determine the client associated with the DHCP request message, wherein determining includes evaluating content of the DHCP request message.

18. The computer-program product of claim 13, wherein the DNS request message is routed to the DNS server, and the DNS server is associated with both the DHCP response message and the client associated with the DHCP request message.

19. The method of claim 2, further comprising:
    generating a combined domain name, wherein generating includes appending the response message domain name associated with the DHCP response message to the request message domain name associated with the DNS request message; and
    routing the DNS request message using the combined domain name, wherein the DNS request message is routed to a DNS server associated with the DHCP response message.

20. The system of claim 8, further comprising instructions configured to cause the one or more processors to perform operations including:
    generating a combined domain name, wherein generating includes appending the response message domain name associated with the DHCP response message to the request message domain name associated with the DNS request message; and
    routing the DNS request message using the combined domain name, wherein the DNS request message is routed to a DNS server associated with the DHCP response message.

21. The computer-program product of claim 14, further comprising instructions configured to cause a data processing apparatus to:
    generate a combined domain name, wherein generating includes appending the response message domain name associated with the DHCP response message to the request message domain name associated with the DNS request message; and route the DNS request message using the combined domain name, wherein the DNS request message is routed to a DNS server associated with the DHCP response message.

\* \* \* \* \*